United States Patent [19]

Langer et al.

[11] 4,362,471
[45] Dec. 7, 1982

[54] ARTICLE, SUCH AS A TURBINE ROTOR AND BLADE WHICH COMPRISES A FIRST ZONE OF A NONOXIDE CERAMIC MATERIAL AND A SECOND ZONE OF A SOFTER MATERIAL

[75] Inventors: Manfred Langer, Fallersleben; Johann Siebels, Wolfsburg, both of Fed. Rep. of Germany

[73] Assignee: Volkswagenwerk Aktiengesellschaft, Wolfsburg, Fed. Rep. of Germany

[21] Appl. No.: 127,393

[22] Filed: Mar. 5, 1980

Related U.S. Application Data

[62] Division of Ser. No. 635,399, Nov. 26, 1975, Pat. No. 4,214,906.

[30] Foreign Application Priority Data

Nov. 29, 1974 [DE] Fed. Rep. of Germany ....... 2456435

[51] Int. Cl.³ ............................................. F01D 5/28
[52] U.S. Cl. ............................ 416/241 B; 416/213 R; 416/244 A
[58] Field of Search ............ 416/241 B, 244 A, 213 R

[56] References Cited

U.S. PATENT DOCUMENTS

| 2,431,660 | 11/1947 | Gaudenzi | 416/241 B |
|---|---|---|---|
| 2,783,966 | 3/1957 | Sörensen | 416/241 B |
| 3,665,585 | 5/1972 | Dunn | 416/241 B X |
| 3,854,189 | 12/1974 | Ezis et al. | 416/241 B X |
| 3,885,294 | 5/1975 | Chaundy et al. | 416/241 B X |
| 3,887,411 | 6/1975 | Goodyear et al. | 416/241 B X |
| 3,887,412 | 6/1975 | Styhr et al. | 416/241 B X |
| 3,911,188 | 10/1975 | Torti et al. | 428/218 |
| 3,940,268 | 2/1976 | Catlin | 416/244 A |
| 3,966,885 | 6/1976 | May | 416/241 B X |
| 3,973,875 | 8/1976 | Bird | 416/241 B |
| 4,076,456 | 2/1978 | Tree et al. | 416/241 B |
| 4,214,906 | 7/1980 | Langer et al. | 416/213 R |

OTHER PUBLICATIONS

Published Report of A. F. McLean, E. A. Fisher, and R. J. Bratton, "Brittle Materials Design, High Temperature Gas Turbine,38 Army Materials and Mechanic Research Center, CTR 72–19, Sep. 1972—p. 49.

*Primary Examiner*—Everette A. Powell, Jr.
*Attorney, Agent, or Firm*—Brumbaugh, Graves, Donohue & Raymond

[57] ABSTRACT

The method produces an article which has a first zone comprising a nonoxide ceramic material (which materials cannot be soldered or welded) and a second zone comprising a different, softer material such as one which can be soldered or welded to other parts. A transition layer between the zones of the article comprises both materials for bonding the zones together. The method forms the article from powders with heat and pressure.

14 Claims, 4 Drawing Figures

ARTICLE, SUCH AS A TURBINE ROTOR AND BLADE WHICH COMPRISES A FIRST ZONE OF A NONOXIDE CERAMIC MATERIAL AND A SECOND ZONE OF A SOFTER MATERIAL

This is a division of application Ser. No. 635,399, filed Nov. 26, 1975, now U.S. Pat. No. 4,214,906.

BACKGROUND OF THE INVENTION

The significance of the invention is most easily described in relation to a turbine for a gas turbine engine. In order to obtain a high specific capacity in a turbine jet power plant such as a gas turbine engine to render it competitive with conventional internal combustion engines, it is necessary to operate the turbine engine at a comparatively high gas temperature such as 1,350° C. At such temperatures it has been found undesirable to use metallic materials including those often called super-alloys for the turbines. Instead, techniques of turbine manufacture suggest the use of refractory (high-temperature resistant) ceramic material and, preferably, nonoxide ceramic materials such as those of the ceranox group which includes, particularly, $Si_3N_4$ and SiC. U.S. Pat. No. 3,905,723 discloses a ceramic turbine made entirely from this kind of material.

Although the ceramic materials described are desirable for forming turbines, it is difficult to fasten turbines or other articles made from these materials to other structures such as a metallic turbine shaft. Until now, connections of this type could be made only with great difficulty.

The low coefficient of thermal expansion of the ceramic materials is one advantage of their use for turbines. This advantage, however, becomes a disadvantage when faced with the problem of connecting the turbine to a shaft with a different coefficient of thermal expansion.

The hardness and brittleness of the ceramic materials present further problems for connecting articles made therefrom to other structures. Special treatments which present particular risk of damage to the ceramic article and are costly have been required. Welded or soldered joints between the ceramic material and the other structure cannot be made because the ceranox or the ceramic materials are not receptive to welding of soldering operations.

SUMMARY OF THE INVENTION

It is therefore an object of the invention to provide a method of producing an article which comprises, in a first zone, a nonoxide ceramic material and, in a second zone, a different, softer material such as one which can be soldered or welded to other structures.

It will be immediately understood from the object of the invention that the method is not limited to producing turbines nor are turbines the only articles which can be produced by the method. Rather, the method may be used to produce a variety of articles having the distinguishing two zones. Such articles are particularly useful when it is desired to weld or solder the one zone to another part.

In general, the method comprises molding the zoned article from appropriate materials in powdered form with at least pressure. A transition layer forms between the zones where the powder for each zone mingles with the other in the mold. The transistion layer thus comprises at least the materials of both zones or compounds thereof and bonds the zones together.

The articles produced by the method then comprises a first zone of a nonoxide ceramic material and a second zone of a different material such as one which can be soldered or welded to other parts. The resulting article thus has the properties of the ceramic material in the zone comprised of the ceramic material and the properties of the other material in the other zone. For example, a turbine can be made having a portion such as the blades with the desirable properties of ceranox nonoxide ceramic material and a portion such as the hub with the desirable properties of being solderable or weldable to a metallic turbine shaft. Inasmuch as relatively simple welding or soldering operations can connect the turbine to the shaft, the risk of damage and the cost of special treatments for producing the turbine and shaft combination are avoided.

As later described in greater detail, there are two preferred forms of the method. In one, the materials for forming the zones of the article are charged into portions of a mold which correspond, respectively, to the zones of the article. The powdered materials are then heated and pressed in the mold to form the finished, solid article. Suitable temperatures for this form of the method are in a range from 1200° C. to 1850° C. with pressures of 50 to 1000 kg/cm² with 1600° C. to 1750° C. at 300 to 500 kg/cm² being preferred.

In the other practice of the method, the article is first cold pressed from powders with a powdered material for one zone which will form the desired ceramic material only after further treatment. For example, powdered silicon can be cold molded with the other material in portions of the mold corresponding to the zones of the article and then heated in a nitrating atmosphere for forming the desired nonoxide ceramic. Cold pressed is here defined merely as molding at a temperature low enough to avoid undesired chemical reactions of the materials, but not necessarily without any addition or generation of heat and specifically permitting bonding between the zones at the transition layer.

Both forms of the method may also include molding the article with a solution and then evaporating the solution and possibly other salts. This technique is sometimes called slip-casting.

At least certain nonoxide ceramic materials are known to give off a gas when they are heated to the temperatures desired for forming the article. It is therefore a preferred practice of the first form of the method (in which the materials are enclosed in a mold during heating) to select a material for the second zone which will react with the gas given off upon heating the ceramic material to form a solid compound. The heat-liberated gas then forms particles of a solid compound in the article rather than pores or bubbles of the gas which could more seriously weaken the article. In a related an also preferred form of this method, a small amount of another material or a different form of the material of the second zone may be introduced into the mold at the transition between the zones in the mold, the additional material or form of material being selected for combining with the materials of both zones and for reacting with the heat-liberated gas to form a solid compound therewith at, at least, the transition layer formed in the article.

Suitable nonoxide ceramic materials for the first zone of the article specifically include $Si_3N_4$, SiC, boron nitride, and Sialons, the latter being a series of compounds resulting from the substitution of aluminum and oxygen in various degrees into a silicon nitride lattice. Suitable materials for the second, softer zone specifically include $Al_2O_3$, 52% Cu-35% Cr-13% Ni, 35% Cu-15% Cr-50% Ni, Co-Ni-Fe compounds (or those also including Mo), transition metals such as ferrous compounds, and transition metal compounds comprising a group of materials commercially available from the DuPont Company under the name Tribalogy and described in its Bulletin No. 1 dated Mar. 1973. Suitable third materials, for forming a solid compound in the transition layer, specifically include Al, Mo and B.

DESCRIPTION OF THE DRAWINGS

Preferred forms of the invention, which are intended to illustrate but not to limit the invention, will now be described with reference, in part, to the drawings in which.

DESCRIPTION OF PREFERRED FORMS OF THE METHOD AND THE ARTICLES PRODUCED THEREBY

One Form of the Method

In one form of the method, a first portion of a mold corresponding to the first zone of the article to be made is charged with a nonoxide ceramic material in powdered form. Another portion of the mold corresponding to the second zone of the article is charged with $Al_2O_3$ which is also in powdered form. In charging the mold with the materials, a transition region frame where powder of both materials mingle. The transition region is, as a rule, very small with respect to the depths of the zones of the two materials even when, as later described, the zone with the $Al_2O_3$ (which can be soldered or welded) is also relatively narrow as compared to the nonoxide ceramic zone.

In an example in which the nonoxide ceramic material is $Si_3N_4$, it is additionally desirable to place a few particles of a material which will react with the components of the ceramic material (silicon or nitrogen) to form a solid component therewith at the transition region. For example, particles of pure Al or B may be placed at the transition portion. Then, upon heating and pressing the contents of the mold to form the solid article therefrom, silicon or nitrogen gas liberated from the ceramic material by the heat will react with the Al or B to form a solid compound therewith rather than the pores or bubbles which the gas would have otherwise formed at the transition region.

With at least the powdered nonoxide ceramic material such as $Si_3N_4$ and the material which can be soldered or welded such as $Al_2O_3$ in the portions of the mold corresponding to the zones of the article to be produced, the powdered material is heated and pressed to form the solid article preferably at 1600° C. to 1750° C. at 300 to 500 kg/cm². A transition layer forms where the particles of the two powders mingle. For the materials mentioned, the transition layer will then comprise at least $Si_3N_4$-$Al_2O_3$, a sialon. Of course, if some particulate aluminum were also introduced at the transition portion, as described, and the heat of the molding process liberates only nitrogen from the $Si_3N_4$, the transition layer may also include some solid aluminum-nitrogen compounds.

An Article Produced by the Method

Figure 1:
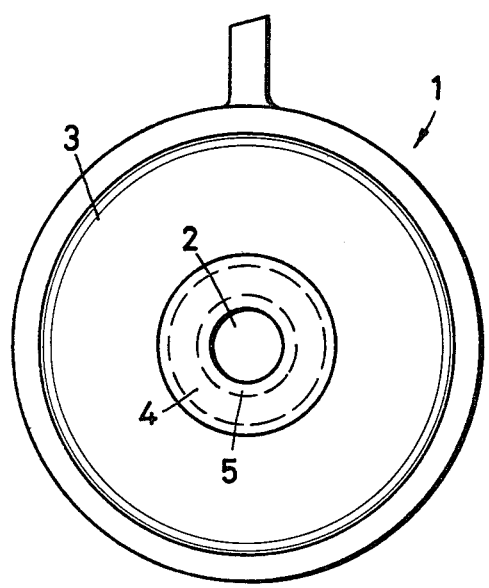
FIG. 1 is an elevation of an article (a turbine) made by one practice of the method.
Figure 2:
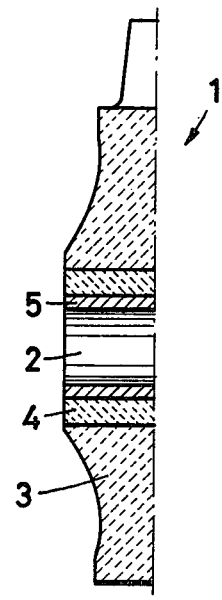
FIG. 2 is another view, partly in section, of the article shown in FIG. 1.

The article 1 (FIGS. 1-2) produced by the method just described then comprises an annular zone of practically pure $Si_3N_4$ 3 about the transition layer 4 and a zone of practically pure $Al_2O_3$ 5. For many articles, the zone 5 of the material which can be soldered or welded ($Al_2O_3$) may be relatively thin as compared to the zone of the ceramic material. The resulting article, for example a turbine, may thus comprise mostly the nonoxide ceramic material with a significantly smaller portion just large enough for welding or soldering of the other material ($Al_2O_3$).

The practice of the method just described is particularly suitable when the article produced by the method is to be soldered or welded to another part (shaft 2) close to the ceramic zone of the article and the ceramic material has the properties desired for the article except for fastening to other parts. Using a turbine, again, as an example, the previously described method is particularly suitable for forming a turbine comprising substantially the first, ceramic zone as an annular blade portion about a hub merely for welding or soldering attachment to the shaft and comprising the second zone at the inside of the hub. Sometimes, however, it is desired to produce an article having a more substantial second zone which can be soldered or welded to another part at some distance from the first ceramic zone. For example, it may be desired to produce a turbine having an integral shaft projecting therefrom, the shaft being the second zone of the article.

Another Article Produced by the Method

Figure 3:
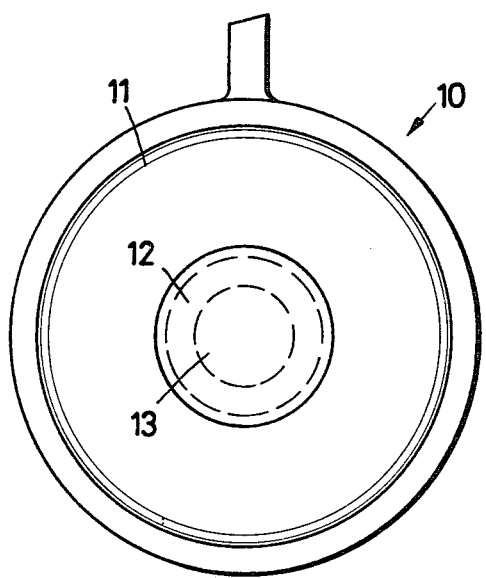
FIG. 3 is an elevation of another article (also a turbine) made by the method.
Figure 4:
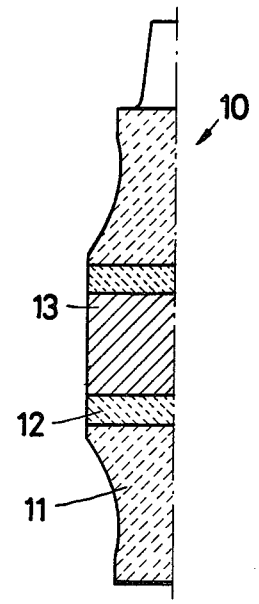
FIG. 4 is another view, partly in section, of the article shown in FIG. 3.

The method can also form an article 10 of the latter type as shown in FIGS. 3-4. For such an article, it would often and obviously be desired to have the second zone 13 formed of a metal of the transition group such as a ferrous metal or mixture of ferrous metals. The ferrous metals are then charged in powdered form into a portion of a mold corresponding to the second zone of the article and a nonoxide ceramic material 11 such as silicon or boron nitride is charged in powdered form into a portion of the mold corresponding to the annular first zone thereabout. A hot pressing processing is then applied as before described to form the finished solid article.

Preferred practice in producing an article having a substantial second zone also includes introducing a silicide or nitride former, for example Mo, into the transition region where the powders of the two materials mingle to form the transition layer 12 without gas bubbles.

Another Form of the Method

Still another practice of the method differs, not by the structure of the article produced by the method, but in the way the method is carried out. In the practice of this method, a powdered material which can form a nonoxide ceramic material when treated as by nitrating, for example Si, and powdered material for the second zone (and transition layer) are molded with pressure, but without sufficient heat to cause a chemical reaction in the materials. The first zone and the transition layer are then subjected to a nitrating atmosphere of, for example, $N_2$ or $NH_3$, while supplying heat (preferably 1200° to 1600° C.) and keeping the second zone covered or otherwise excluded from the nitrating atmosphere. The combination of the cold molding process and the subsequent nitrating then forms an article having a first zone of a nonoxide ceramic material and a second zone of a material which can be soldered or welded, with a transition layer therebetween.

When, however, SiC is used for the nonoxide ceramic material, carburization in the way just described for nitrating Si would be difficult. It is therefore preferably in this form of the method to cold mold powdered SiC (with the powder for the second zone). The SiC and transition region are then sintered or heat treated under a buffer gas (non-oxidizing atmosphere) to produce a diffusion of grain interfaces in the powder. The resulting article then comprises a nonoxide ceramic (SiC) zone, a transition layer, and a second zone as before described.

Although the invention has heretofore been described with the material for the second zone as being a material capable of being soldered or welded, it will also be appreciated that the other material could also be merely sufficiently ductile (soft or non-brittle) to be amenable to other fastening means. For example, mechanical fasteners are well known for use with dilute materials such as the specifically mentioned ferrous compounds. For this purpose, a soft or ductile material is one which can be mechanically worked without significant difficulty as for mechanical fastening.

We claim:

1. An article, such as a turbine rotor and blade, which comprises a first zone of a nonoxide ceramic material; a second zone of a different, softer material which can be soldered or welded; and a transition region between said zones which bonds said zones together; wherein said transition region comprises intermingled materials of the first and second zones, which article is formed from two powders, the first powder being capable of forming said nonoxide ceramic material and the second powder being selected from the group consisting of $Al_2O_3$, 52% Cu-35% Cr-13% Ni, 35% Cu-15% Cr-50% Ni, Co-Ni-Fe compounds, Co-Ni-Fe-Mo compounds, transition metals, and transition metal compounds, which powders are introduced into respective portions of a mold corresponding to said first and second zones, are mingled to form said transition region, and are molded together at least by the application of pressure to form a solid article.

2. An article, such as a turbine rotor and blade, which comprises a first zone of a nonoxide ceramic material; a second zone of a different, softer material which can be soldered or welded; and a transition region between said zones which bonds said zones together; wherein said transition region comprises intermingled materials of the first and second zones, which article is formed from two powders, the first powder being a nonoxide ceramic material and the second powder being said different material, which are introduced into respective portions of a mold corresponding to said first and second zones, which are mingled to form said transition region, and which are molded together by hot molding to form a solid article and wherein particles from a third material are introduced in the transition region capable of forming a solid compound with a gas liberated from one of the other materials by the heat generated by the hot molding step and being selected from the group consisting of Al, Mo, and B, to substantially prevent the formation of gas bubbles which the gas would otherwise have formed in the transition region.

3. An article, such as a turbine rotor and blade, which comprises a first zone of a nonoxide ceramic material; a second zone of a different, softer material which can be soldered or welded; and a transition region between said zones which bonds said zones together; wherein said transition region comprises intermingled materials of the first and second zones, which article is formed from two powders, the first powder being a nonoxide ceramic material and the second powder being said different material, which are introduced into respective portions of a mold corresponding to said first and second zones, which are mingled to form said transition region, and which are molded together by hot molding to form a solid article and wherein said second powder is capable of forming a solid compound with a gas liberated from the nonoxide ceramic material by the heat generated by the hot molding step, thereby substantially preventing the formation of gas bubbles which the gas would otherwise have formed in the article.

4. An article, such as a turbine rotor and blade, which comprises a first zone of a nonoxide ceramic material; a second zone of a different, softer material which can be soldered or welded; and a transition region between said zones which bonds said zones together; wherein said transition region comprises intermingled materials of the first and second zones, which article is formed from two powders, the first powder being a nonoxide ceramic material and the second powder being said different material, which are introduced into respective portions of a mold corresponding to said first and second zones, which are mingled to form said transition region, and which are molded together by hot molding to form a solid article and wherein the nonoxide ceramic material is $Si_3N_4$ and said second powder is a silicide or nitride former.

5. An article, such as a turbine rotor and blade, which comprises a first zone of a nonoxide ceramic material; a second zone of a different, softer material which can be soldered or welded; and a transition region between said zones which bonds said zones together; wherein said transition region comprises intermingled materials of the first and second zones, which article is formed from two powders, the first powder being capable of forming said nonoxide ceramic material and the second powder being said different material, which are introduced into respective portions of a mold corresponding to said first and second zones, which are mingled to form said transition region, and which are molded together at least by the application of pressure to form a solid article and wherein the molding process is carried out by cold molding and said first powder is a Si material capable of forming nonoxide ceramic material upon further treatment, and wherein said first powder and the mingled first and second powders are treated with heat in a gas atmosphere, after they have been cold molded, to form the first zone of a nonoxide ceramic material and the transition region.

6. An article as in claim 1, 2 or 3, wherein said first powder is a nitride.

7. An article as set forth in claim 1, 2 or 3, wherein said first powder is selected from the group consisting of $Si_3N_4$, SiC, boron nitride, and sialon compounds.

8. An article as set forth in claim 4, wherein said second powder is $Al_2O_3$ which forms a sialon compound and nitrides at least in the transition region with gases liberated from the $Si_3N_4$ by the heat.

9. An article as set forth in claim 5, wherein the first powder is Si and the gas atmosphere is a nitrating atmosphere.

10. An article as set forth in claim 5, wherein said first powder is SiC and the gas atmosphere is a non-oxidizing atmosphere which is capable of producing, with the heat generated by the treating step, a diffusion of grain interfaces in said first powder to form said first zone of a nonoxide ceramic material.

11. An article as set forth in claim 1 wherein the first zone comprises an annular part around the second zone and transition region.

12. An article as set forth in claim 11 wherein the first zone comprises a blade portion of a turbine and the second zone comprises a hub.

13. An article as set forth in claim 12 wherein the hub is annular for receiving a shaft.

14. An article as set forth in claim 12 wherein the hub is solid for forming a shaft.

* * * * *

UNITED STATES PATENT AND TRADEMARK OFFICE
CERTIFICATE OF CORRECTION

PATENT NO. : 4,362,471

DATED : December 7, 1982

INVENTOR(S) : Langer et al.

It is certified that error appears in the above-identified patent and that said Letters Patent is hereby corrected as shown below:

Title page, Item 30, "2456435" should read --2456453--;
Title page, 2nd col., 3rd line under "OTHER PUBLICATIONS", "38" should be -- " --;
Column 1, line 47, "of" should read --or--;
Column 2, line 57, "an" should read --and--;
Column 3, line 9, "Tribalogy" should read --Tribaloy--;
Column 5, line 12, "preferably" should read --preferable--; and
Column 5, line 27, "dilute" should read --ductile--.

Signed and Sealed this

Fifth Day of April 1983

[SEAL]

Attest:

GERALD J. MOSSINGHOFF

Attesting Officer

Commissioner of Patents and Trademarks